Feb. 21, 1939.     D. W. SHERMAN     2,148,177
CONTROL ARM FOR VEHICLE SPRINGS
Filed March 14, 1938
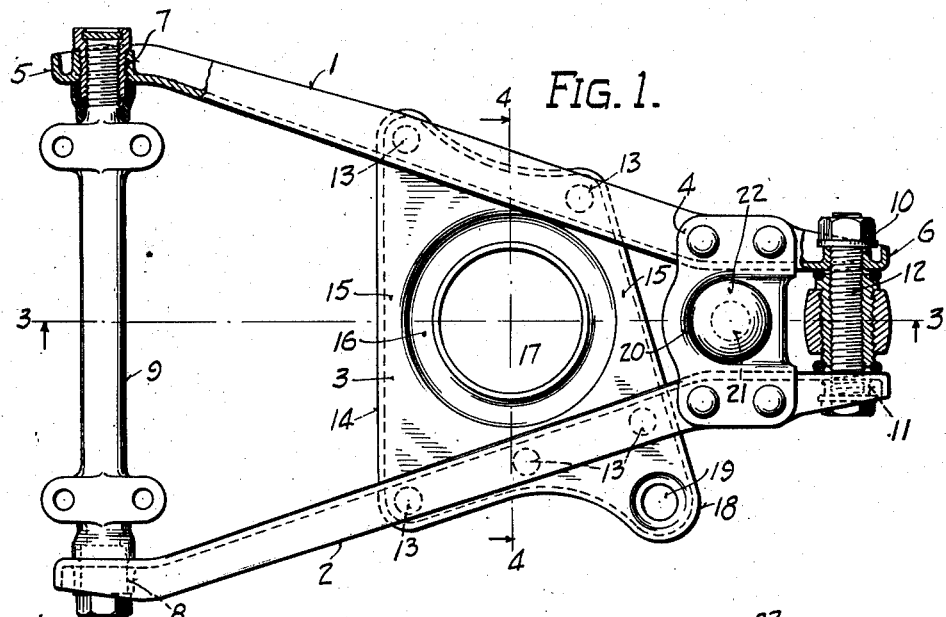
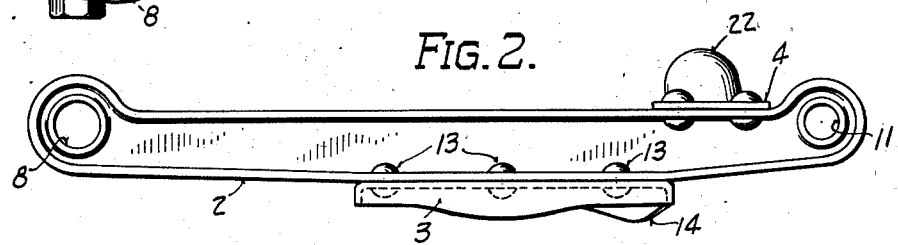
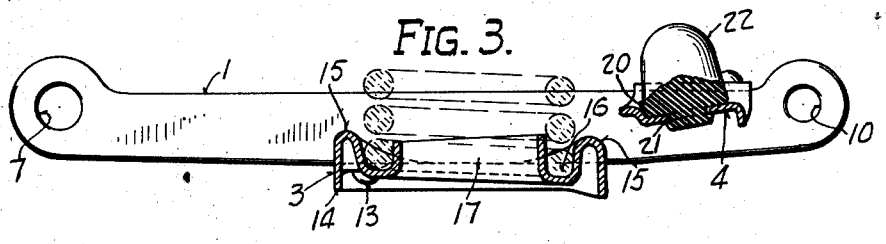
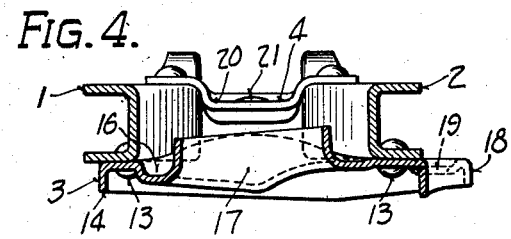
Donald W. Sherman
INVENTOR.
BY *Elwin A. Andrus*
ATTORNEY.

Patented Feb. 21, 1939

2,148,177

UNITED STATES PATENT OFFICE 2,148,177

CONTROL ARM FOR VEHICLE SPRINGS

Donald W. Sherman, Shorewood, Wis., assignor to A. O. Smith Corporation, Milwaukee, Wis., a corporation of Wisconsin Application March 14, 1938, Serial No. 195,692

5 Claims. (Cl. 267—20)

This invention relates to control arms for vehicle springs and has particular relation to the supporting wishbone arms used to support the vertical coil spring in present day independent wheel mountings of automobiles.

Heretofore such arms have been constructed of forgings connected by a plate forming the spring seat therebetween. This construction has been expensive not only due to the forging and machining operations, but due to the added weight of metal necessary to make arms of the required shape and strength.

Attempts have been made heretofore to reduce the cost of these arms by constructing them of a sheet metal pan-like structure but they embodied the use of special end forgings or bushings and the distribution of metal in these constructions was such as to result in very little saving in weight and in final cost.

The object of the present invention is to provide a sheet metal control arm which is substantially lighter in weight and which can be manufactured at a much less cost than former constructions.

Another object is to provide a light weight sheet metal control arm which can be fabricated to accurate dimensions with a minimum of machining operations.

Other objects will appear hereinafter in connection with the description of a preferred embodiment illustrated in the accompanying drawing.

In the drawing:

Figure 1 is a top plan view of the control arm;

Fig. 2 is a front elevation of the arm;

Fig. 3 is a section taken on line 3—3 of Fig. 1; and

Fig. 4 is a section taken on line 4—4 of Fig. 1.

The control arm comprises, in general, two wishbone arms 1 and 2, a plate 3 attached to both arms and forming a spring seat therebetween, and preferably a second plate 4 joining the arms for bumper attachment.

The arm 1 is formed from sheet metal and is pressed into channel shape throughout its length with cup shaped ends 5 and 6. By having the flange of the channel continuous at the ends it is possible to strengthen the ends considerably and at the same time lighten the weight of the arm.

The arm 2 has the same construction as the arm 1 except for a reversal in shape so that the arms may be arranged with their vertical webs facing each other. The arms 1 and 2 are arranged at an angle like a wishbone and they preferably have their corresponding ends bent parallel for a short distance.

The inner ends of the arms 1 and 2 have aligned openings 7 and 8, respectively, formed with extruded flanges made in accordance with the invention set forth and claimed in copending application Serial No. 189,925, filed February 11, 1938, for Embossing metal plates by the present inventor. The flanges surrounding openings 7 and 8 are preferably threaded for receiving the threaded ends of a bearing shaft 9 upon which the control arm pivots.

The outer ends of the arms 1 and 2 have aligned openings 10 and 11, respectively formed in the same manner as openings 7 and 8 and having threaded flanges for receiving a bolt 12, which holds the end steering knuckle and stub axle for the wheel.

The plate 3 which forms the spring seat is secured to the arms 1 and 2 as by rivets 13 which pass through the plate and the lower flanges of the respective arms. The plate 3 is pressed to provide a stiffening flange 14 around its rim and stiffening channels 15 of substantial depth extending across between the arms on either side of the spring seat. The spring seat is formed of a groove 16 of varying depth and having a bottom adapted to receive the end of the coil spring. The plate 3 has an opening 17 at its center and is flanged around the opening to hold the spring in place.

The plate 3 has a forward extension 18 having a hole 19 for attaching the links of a torsion stabilizer rod for preventing roll of the car.

The plate 4 is the front axle bumper bracket and is riveted on top of the arms 1 and 2 adjacent their outer ends. It has a depression 20 with an opening 21 at the center for receiving a suitable rubber bumper block 22 for preventing the arms from hitting the frame side bar.

The control arm described has many advantages and can be made for much less than the cost of the forge type of arm. It is much stronger than the pan type heretofore attempted and has proven in tests to be fully satisfactory. The construction of the arms of channel shape with their flanges extending outwardly provides a structure somewhat like an I beam in its balanced load and the metal is therefore distributed most efficiently for the service requirements.

The invention may have various embodiments within the scope of the claims.

The invention is claimed as follows:

1. A pivoted control arm for independent wheel suspension for automobiles, comprising a pair of sheet metal channel arms disposed at an angle and having the outwardly extending flanges thereof formed continuously around the ends, the ends of said arms being provided with aligned embossed openings, and means secured to said arms for supporting a coil spring.

2. A pivoted control arm for independent wheel suspension for automobiles, comprising a pair of spaced sheet metal channel arms disposed at an angle to each other with their vertical webs facing each other and their respective upper and lower flanges facing outwardly, and means securing said arms together in the central portion thereof and providing a seat for a coil spring therebetween.

3. A pivoted control arm for independent wheel suspension for automobiles, comprising a pair of angularly spaced sheet metal channel arms disposed with their vertical webs facing each other and their respective upper and lower flanges facing outwardly, and means supported by said arms in the central portion thereof and providing a seat for a spring, said arms having aligned openings at their corresponding ends for receiving connecting means.

4. A pivoted control arm for independent wheel suspension for automobiles, comprising a pair of sheet metal channel arms having cup shaped ends and disposed at an angle with their vertical webs facing each other and their respective upper and lower flanges facing outwardly, the corresponding ends of said arms having aligned openings for receiving fastening members, and a spring supporting plate secured to the lower flanges of the arms and joining the same in the central portion thereof.

5. A pivoted control arm for independent wheel suspension for automobiles, comprising a pair of sheet metal channel arms having cup shaped ends and disposed at an angle with their vertical webs facing each other and their respective upper and lower flanges facing outwardly, the corresponding ends of said arms having aligned openings for receiving fastening members, a spring supporting plate secured to the lower flanges of the arms and joining the same in the central portion thereof, and a plate secured to the upper flanges of said arms and joining the same together.

DONALD W. SHERMAN.